United States Patent
Scholten

(10) Patent No.: US 12,342,833 B2
(45) Date of Patent: Jul. 1, 2025

(54) ONE STEP PROCEDURE FOR PRODUCING A PROTEIN OLEOGEL

(71) Applicant: WAGENINGEN UNIVERSITEIT, Wageningen (NL)

(72) Inventor: Elke Scholten, Wageningen (NL)

(73) Assignee: WAGENINGEN UNIVERSITEIT, Wageningen (NL)

( * ) Notice: Subject to any disclaimer, the term of this patent is extended or adjusted under 35 U.S.C. 154(b) by 749 days.

(21) Appl. No.: 17/607,049

(22) PCT Filed: May 29, 2020

(86) PCT No.: PCT/NL2020/050347
§ 371 (c)(1),
(2) Date: Oct. 28, 2021

(87) PCT Pub. No.: WO2020/242313
PCT Pub. Date: Dec. 3, 2020

(65) Prior Publication Data
US 2022/0295811 A1    Sep. 22, 2022

(30) Foreign Application Priority Data
May 29, 2019   (EP) .................................... 19177335

(51) Int. Cl.
| | | |
|---|---|---|
| A23D 7/005 | (2006.01) | |
| A23D 9/007 | (2006.01) | |
| A23J 3/00 | (2006.01) | |
| A23L 13/40 | (2023.01) | |

(52) U.S. Cl.
CPC ............ *A23D 7/0053* (2013.01); *A23D 9/007* (2013.01); *A23J 3/00* (2013.01); *A23L 13/426* (2016.08)

(58) Field of Classification Search
CPC ......... A23D 7/0053; A23D 9/007; A23J 3/00; A23L 13/426; A23L 33/17
USPC ........................................................ 426/602
See application file for complete search history.

(56) References Cited

U.S. PATENT DOCUMENTS

| | | | |
|---|---|---|---|
| 2015/0157038 A1 | 6/2015 | Ergun et al. | |
| 2019/0075811 A1 | 3/2019 | Hild et al. | |

FOREIGN PATENT DOCUMENTS

| | | | |
|---|---|---|---|
| CN | 109122920 A | | 1/2019 |
| EP | 1836897 A1 | | 9/2007 |
| EP | 3011836 A1 | | 4/2016 |
| EP | 3387909 A1 | | 10/2018 |
| IN | 201741017576 A | * | 12/2018 |
| WO | WO2015/095472 A1 | | 6/2015 |
| WO | WO2017/172594 A1 | | 10/2017 |

OTHER PUBLICATIONS

De Vries et al.; Tuning the rheological properties of protein-based oleogels by water addition and heat treatment; Food Hydrocolloids; vol. 79; pp. 100-109; Jun. 1, 2018.
Hu et al.; Optimal diets for prevention of coronary heart disease; Journal of American Medical Association; 288(20); pp. 2569-2578; Nov. 27, 2002.
Marangoni et al.; Organogels: an alternative edible oil-structuring method; Journal of the American Oil Chemists' Society; 89(5); pp. 749-780; May 1, 2012.
Mensink et al.; Effect of dietary trans fatty acids on high-density and low-density lipoprotein cholesterol levels in healthy subjects; New England Journal of Medicine; 323(7); pp. 439-445; Aug. 16, 1990.
Mensink et al.; Effects of dietary fatty acids and carbohydrates on the ratio of serum total to HDL cholesterol and on serum lipids and apolipoproteins: a meta-analysis of 60 controlled trials; The American journal of clinical nutrition; 77(5): 1146-1155; May 1, 2003.
Patel et al.; Edible oil structuring: an overview and recent updates. Food & function; 7(1); pp. 20-29; 2016.
Rogers et al; Marangoni AG. Oil organogels: the fat of the future?; Soft matter; 5(8); pp. 1594-1596; 2009.
Rogers et al.; Novel structuring strategies for unsaturated fatsRMeeting the zero-trans, zero-saturated fat challenge: A review; Food Research Internationa; 42(7); pp. 747-753; Aug. 1, 2009.

* cited by examiner

*Primary Examiner* — Erik Kashnikow
*Assistant Examiner* — Bhaskar Mukhopadhyay
(74) *Attorney, Agent, or Firm* — Shay Glenn LLP

(57) ABSTRACT

The invention relates to methods for the production of an oleogel, comprising providing a dispersion of protein in oil and slowly adding and mixing water to the dispersion to produce a solid oleogel. The invention further relates to 5 an oleogel comprising protein, water and oil, preferably an oleogel that is produced by a method of the invention, and to products comprising an oleogel of the invention.

20 Claims, 1 Drawing Sheet

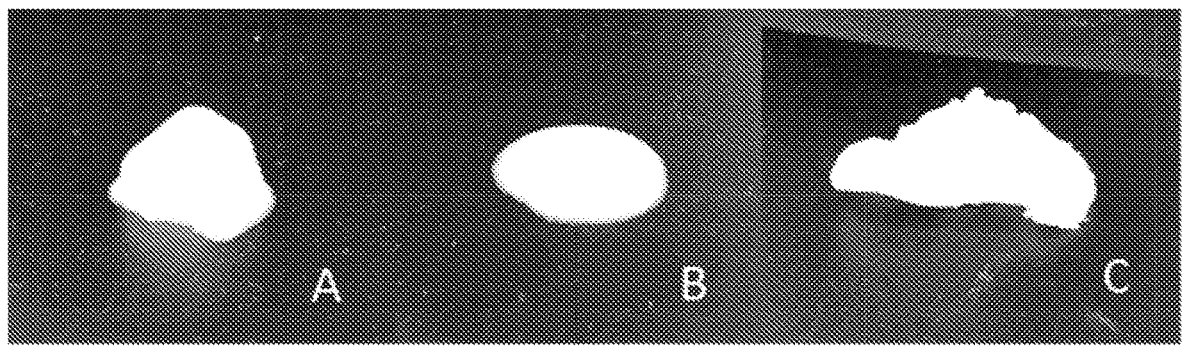

ONE STEP PROCEDURE FOR PRODUCING A PROTEIN OLEOGEL

FIELD

The invention relates to methods for producing a protein oleogel. The invention further relates to an oleogel obtainable with such methods, as well as products comprising such oleogel.

BACKGROUND OF THE INVENTION

It has long been recognized that a diet rich in saturated and trans fats is associated with an increase in the amount of Low Density Lipoprotein cholesterol at an expense of High Density Lipoprotein cholesterol (Mensink and Katan, 1990. New Engl J Med 323: 439-445), which is related to a higher risk of developing coronary artery disease. On the other hand, a diet rich in cis-unsaturated fatty acids decreases these risks (Mensink et al., 2003. Am J Clin Nutrition 77: 1146-1155; Hu and Willett, 2002. J Am Med Association 288: 2569-2578). However, food reformulation is not straightforward as the use of saturated and trans fats has technological benefits such as providing texture and oxidative stability to food products. One interesting alternative, which has gained much attention over the recent years, is the use of so-called oleogels (Patel and Dewettinck, 2016. Food Function 7: 20-29; Rogers, 2009. Food Res Int 42: 747-753; Rogers et al., 2009. Soft Matter 5: 1594-1596; Marangoni, 2012. J Am Oil Chemists' Society 89: 749-780). The purpose of designing edible oleogels is to be able to provide a solid-like structure to liquid oil at room temperature other than by the conventional use of saturated and trans fatty acids.

Polymers have the ability to structure oil. However, many polymers are hydrophilic in nature, which makes their dispersibility in oil difficult. The most extensively studied polymer for oleogel formation is a cellulose derivative, ethylcellulose. For example, US patent application US2015/0157038 describes a method of preparing an edible oleogel comprising an edible triacylglycerol oil or triacylglycerol fat and ethylcellulose, which is heated up to 300° Celsius under an inert atmosphere to form an oleogel. The international patent application WO2017172594 describes an oleogel comprising an ethylcellulose polymer, a food oil and a dispersant. Similarly, the international application WO2014193667 describes an oleogel that is generated by extrusion of ethylcellulose with at least one oily feed material. Furthermore, US patent application US2019/0075811 describes a method of making an ethylcellulose oleogel by slow cooling of a mixture of ethylcellulose polymer and oil from 100° C. to 35° C.

A well-known ingredient that would be a suitable oil gelator with high potential for inclusion in food products is protein. Proteins have good nutritional value, have no regulatory issues for their use and would contribute to 'clean labelling'. Given their hydrophilic nature and insolubility in oil, proteins are not the most obvious choice for the preparation of oleogels. At normal conditions, protein will not disperse well in oil, and no gel forming ability of proteins in oil is obtained. Apparently, there is not enough attractive interaction between the proteins and therefore they sediment over time.

Nevertheless, attempts have been made to generate oleogels comprising protein as gelator for oil. For example, the Chinese patent application CN109122920A describes an oil in water emulsion comprising protein, grease, water and edible glue. The European patent application EP1836897 describes a solid product comprising oil-droplets having a diameter in the range of 0.1 to 100 microns, comprising cross-linked proteins at the interface of said droplets. Said proteins are cross-linked, for example, by addition of glutaraldehyde and/or transglutaminase. The European patent application EP3011836 describes stable dispersants of protein in oil using a solvent exchange procedure in which water is exchanged in consecutive steps for an oil.

There is thus a need for a simple, convenient procedure for the production of an oleogel that comprises mainly protein and oil, without a need to provide further ingredients such as a glue or a chemical cross-linker.

BRIEF DESCRIPTION OF THE INVENTION

The current invention describes the production of an oleogel that is based on proteins without the use of non-edible solvents or the presence of surfactants. Proteins are ideal, as they are not considered an "additional" ingredient on a food label and do not need an E-number. In addition, they are considered as healthy.

Water was shown to increase the interactions between proteins and to induce strong network formation. This is most likely due to strong capillary interactions, with a maximum network formation at 0.5 g water/g protein (de Vries et al., 2018. Food Hydrocolloids 79:100-109). As is known to a person skilled in the art, this optimal water content will vary between about 0.05 and 2 g water/g protein, for different types of protein. An additional heating step was shown to increase the gel strength even further (de Vries et al., 2018. Food Hydrocolloids 79:100-109).

The invention therefore provides a method for the production of an oleogel, the method comprising (i) providing a 0.5-40 wt. % dispersion of protein in oil; (ii) adding between 0.05 and 1 gram of water per gram protein to the dispersion; and (iii) mixing the ingredients for a sufficient period of time to produce a solid oleogel.

If required, the protein in oil dispersion may be homogenized, preferably by sonication, prior to the addition of water.

If required, between 0.1 and 5 gram of a dispersing agent, preferably ethanol, is added to the protein in oil dispersion, prior to the addition of water.

In a preferred method, the total amount of water is added in two or more steps to the dispersion, preferably the total amount of water is added in steps of 0.05-0.25 water/gram protein. Each of these steps preferably is allowed to mix for a period of 10 minutes-48 hours, preferably for a period of 1-24 hours.

After the addition of water, the produced solid oleogel may be heated to a temperature between 25 degrees Celsius and the boiling point of the oil.

A preferred method of the invention results in the production of an edible solid oleogel.

The protein that is used in the methods for producing an oleogel according to the invention preferably is a globular protein.

The oil that is used in the methods for producing an oleogel according to the invention preferably is a vegetable oil.

Oleogels according to the invention can thus be used as an alternative for solid fats, such as palm oil, cocoa butter, animal fat and milk fat. With the present method an oleogel can be obtained that can be used for inclusion in food products, cosmetics or other personal care products, but also e.g. for drug delivery (e.g. a pharmaceutical product). The oleogel thus provided can be Generally Recognized As Safe (GRAS) material.

The invention further provides an oleogel, preferably an edible oleogel, comprising 0.5-40 wt. % protein, preferably 8-40 wt. % protein, 0.1-40 wt. % of water, and 20-99.5 wt. % oil. Said oleogel preferably is produced by a method of the invention.

The invention further provides a product, preferably a food product, comprising an oleogel of the invention. Said food product may be selected from baked goods, chocolate and fillings, or is a meat product. A non-food product may be suited for cosmetic and/or pharmaceutical applications.

FIGURE LEGENDS

FIG. 1. Gel-like material obtained by the methods of the invention. Gel mass obtained after adding 0.25 g water/g proteins (A); 0.5 g water/g proteins (B); or 0.75 g water/g proteins (C). All samples were heated at 85° C. for 20 minutes after the addition of water.

DETAILED DESCRIPTION OF THE INVENTION

Definitions

The terms "oleogel" and "protein oleogel", as are used herein, refer to a gel having an oil as a continuous phase, while the percolation structure is based on protein. Said oleogel preferably does not comprise a gelling agent, surfactant, cross-linking agent and/or glue. The oleogel preferably consists of protein and oil, in the presence of a small amount of water.

The term "oil", as is used herein, refers to a lipid-based material comprising glycerides such as triglycerides that is fluid at ambient or room temperature, i.e. at 25 degrees Celsius.

The term "protein", as used herein, refers to a polyamino acid molecule such as albumin, immunoglobulin, hemoglobin, ovalbumin, $\alpha$-lactoglobulin, and $\beta$-lactoglobulin. Said poly amino acid molecule comprises at least 25 amino acid residues, more preferred at least 50 amino acid residues. The term protein includes reference to a plurality of different proteins, such as whey protein, mixtures of proteins such as a mixture of blood and whey proteins, and/or to modified proteins such as acetylated, oxydated, hydroxylated, glutamylated, amidated, de-amidated, methylated and trimethylated proteins. The modifications may have been formed naturally or as a result of chemical reactions during isolation and enzymatic processing of the proteins.

The term "dispersion", as is used herein, refers to a system in which particles of one material, in the present case protein particles, are dispersed in a continuous phase of another material, in the present case oil, preferably vegetable oil.

The term "food product", as used herein, refers to an edible product. Preferred edible products are processed food- and feed-products including, but not limited to, dairy products such as hard/semi-hard and soft cheese, shredded cheese, cottage cheese, sour cream, cream cheese, ice cream and dairy desserts such as yoghurt and fruit yoghurt; meat products such as sausages, salami, smoked ham and smoked fish; bakery products such as bread, cake, pre-baked bread, toppings and bakery fillings; fruit-derived products such as fruit pulp, marmalade, fruit salads and juices; liquid egg products such as egg yolk, cooled liquid eggs, concentrated frozen and deep frozen eggs; animal feed such as broiler feed and pet food; and vegetable-derived products such as ketchup, paste, olive and soya oil, and soup, for example tomato soup.

The term "meat product", as is used herein, includes reference to a product that is derived from a slaughtered animal. It includes, but is not limited to lung, spleen, kidney, brain, liver, blood, bone, muscle, stomach and intestine. Said meat product may be pork, beef, lamb, mutton, chicken, turkey, venison and/or insect meat such as meat from beetles, butterflies, moths, bees, wasps, ants, grasshoppers, locusts, crickets, cicadas, leafhoppers, planthoppers, including meat from larval stages of these insects such as mealworms and lesser mealworms. The term "meat product" also includes reference to a substitute meat product such as a meat product based on tofu, tempeh, seitan, dairy, mushroom, lentils and such.

Protein

The protein in an oleogel according to the invention may be any protein. However, especially good results were obtained with globular proteins.

Said protein is provided as a powder from which a dispersion in oil is generated. Said powder preferably has an average particle size between 20 nm and 1 mm, more preferably between 100 nm and 10 micron, more preferably between 200 nm and 1 micron. Said average particle size preferably is a volume-based average particle size, as is determined, for example, by laser diffraction.

Suitable proteins include, or are derived from plant material such as soy, wheat, pea, rice, lupine, potato, rapeseed, canola, zein, etc. Yet other suitable proteins include, or may be derived from, animal material such as egg white, including ovalbumin, milk, whey, blood and gelatin which may be obtained from skin and bones. Yet other suitable proteins may be obtained or derived from fungi, algae and/or insects. Hence, as a source for protein e.g. one or more of pig blood serum albumin, pig blood serum immunoglobulin, hen egg ovalbumin, whey protein isolate, whey protein concentrate, soy protein isolate, soy protein concentrate, etc., may be applied.

Preferred proteins include soy proteins, potato proteins and whey proteins.

Oil

An oil that is used to produce an oleogel according to the invention preferably is or comprises unsaturated fatty acids, preferably polyunsaturated fatty acids. Said oil preferably is a vegetable oil, such as coconut oil, corn oil, cottonseed oil, flax seed oil, linseed oil, olive oil, palm oil, peanut oil, safflower oil, soybean oil, sunflower oil, grape seed oil, sesame oil, argan oil, rice oil, rice brain oil, algal oil, canola oil, maize kern oil, and echium oil. Said oil may also be a squid oil, algae oil, insect oil such as for instance oil from meal worms, beetle larvae, crickets, cockroaches, grasshoppers and soldier flies, or fish oil such as salmon oil and halibut oil. The term oil includes reference to a mixture or plurality of different oils such as a mixture of sunflower oil and meal worm oil and a mixture of olive oil and algae oil.

Oleogels and Methods of Producing Said Oleogels

An oleogel preferably is produced by a method comprising (i) providing a 0.5-40 wt. % dispersion of protein in oil; (ii) adding between 0.05 and 1 gram water per gram protein to the dispersion; and (iii) mixing the ingredients for a sufficient period of time to produce a solid oleogel.

If required, a dispersing agent and/or a surfactant may be added to the dispersion of protein in oil to prevent flocculation of the protein particles.

Said dispersing agent may be added when the average size of the protein particles is not fine but coarse, above for example 100 or 200 micron. Said dispersing agent may be a polymeric dispersing agent such as polyvinyl alcohol, glycerine, sorbitol, propylene glycol, alcohol, preferably ethanol, and mixtures thereof.

A preferred dispersing agent is ethanol. When added, ethanol preferably is added at between about 0.1 gram and 5 gram per gram of protein, such as about 0.5 gram ethanol/gram protein, 1 gram ethanol/gram protein or 2 gram ethanol/gram protein.

A dispersing agent preferably is removed prior to generating a product comprising said oleogel. Removal of an alcohol such as ethanol can be performed by heating of the oleogel.

Said surfactant preferably is selected from lecithin, polyglycerol polyricinoleate (PGPR), sodium bis(2-ethylhexyl) sulfosuccinate (AOT), polyoxyethylene (20) sorbitan monolaurate (TWEEN® 20), casein, 2-[2-[3,4-bis(2-methoxyethoxy)oxolan-2-yl]-2-(2-methoxyethoxy)ethoxy] ethyl octadecanoate (polysorbate 60) and mixtures thereof. When added, said surfactant preferably is added at between about 0 and 20 wt. %, such as at 2 wt. %, 5 wt. %, 10 wt. %, or 15 wt. %.

If required, a flavour may be added to the dispersion of protein in oil to prevent flocculation of the protein particles. Said flavour is a natural flavour or a synthetic flavour. Said flavour preferably is a natural flavour, for example based on herbs such as basil and mint, based on spices such as cardamom, clove, and turmeric; based on aromatic seeds-such as aniseed, and cumin; based on fruit such as orange and lemon; based on vegetables such as pees, onions and garlic; based on a process such as caramelized, roasted, fermented, toasted and baked, or based on an added flavour such as a natural extracted flavour, essential oil, essence and extracts.

In a preferred method, the amount of water is added in two or more steps to the dispersion, preferably three or more steps such as four steps, or five steps. The total amount of steps preferably is less than ten steps. The preferred amount of water that is added in each of the steps is between about 0.05 gram and 0.25 gram water/gram protein.

If required, the dispersion of protein in oil may be homogenized, for example by mixing, stirring, and/or by sonicating. Sonication may be applied at a frequency of 10-100 kHz, an amplitude of 10-100%, and a power between 100-1000 W. Mixing may be performed, for example, by employing a homogenizer, for example a homogenizer that is equipped with a set of motorized blades that combines shearing of a sample with extraction by swirling/agitation of the sample solution such as an Omni Mixer Homogenizer, an Omni Macro Homogenizer, or an IKA T 65 digital ULTRA-TURRAX Batch Process Homogenizer.

Following homogenizing, the sample may be centrifuged before water is added. If required, the dispersion of protein in oil may be subjected to a second round of homogenization, for example by a second round of mixing, stirring, and/or by sonicating and, optionally, a second centrifugation step.

Each water addition step is performed for a sufficient time to allow interactions between the proteins, prevent sedimentation, and induce network formation. The water is added in steps to prevent clump formation. A small amount of water will partly "dissolve" in the oil and slowly migrate/diffuse to the hydrophilic proteins. First, the water will enter the dry protein powder and hydrate the proteins. More water that is slowly added will increase the hydration of the proteins. Once the proteins are saturated with water, additional water will act as capillary bridges and will stabilize the oleogel that is to be formed.

Each water addition step is preferably performed for a period of time between 10 minutes and 2 days, such as 2 hours, 5 hours, 12 hours, 16 hours, 24 hours. During mixing, the sample preferably is agitated, preferably continuously agitated, for example by stirring employing a magnetic stirring bar. The ingredients are preferably mixed at a temperature between 10 and 40° C., preferably between 15 and 35° C., such as between 20-25° C.

Following the mixing steps, the sample may be heated to a temperature between 25 and the boiling point or, preferably smoke point, of the oil. As is known to a person skilled in the art, the smoke point is the burning point of an oil, meaning that it is the temperature at which the oil becomes hydrolysed and/or oxidized and starts to produce harmful compounds. The smoke points of some suitable oils are provided in Table 1. A person skilled in the art is able to determine smoke points of other oils, if necessary.

The sample preferably is heated to a temperature between 25 and 95° C., preferably between 60 and 90° C. such as between 75 and 85° C. Said heating step preferably is performed while the sample is agitated, for example by stirring, preferably by continuously stirring.

Said heating may be performed to remove at least part of the water content that is present in the sample, preferably as much water as is possible. In addition, said heating at a higher temperature such as above 60° C. may be performed to stabilize the solid gelly structure that is generated.

After heating, the sample may be cooled, preferably immediately cooled. Said cooling may be performed by incubating the sample in an ice bath or by any other method that is known to a skilled person.

Following homogenization, a solid oleogel may be separated from the liquid, for example by centrifuging.

An oleogel that is produced by the methods of the invention has a storage modulus G' that is greater than the loss modulus G". The storage modulus G' is between 100 and 10*10E6 Pascal, preferably between 1000 and 10*10E4 Pascal, at room temperature.

The oleogel thus obtained may be used in food product and non-food products.

TABLE 1

Smoke points of selected oils.

| Oil | Smoke Point |
|---|---|
| Almond oil | 221° C. |
| Avocado oil | 270° C. |
| Mustard oil | 250° C. |
| Canola oil | 220-230° C. |
| Coconut oil | 177° C. |
| Corn oil | 178° C. |
| Cottonseed oil | 220-230° C. |
| Flaxseed oil | 107° C. |
| Olive oil | 199-243° C. |
| Palm oil | 235° C. |
| Peanut oil | 227-229° C. |
| Rice bran oil | 232° C. |
| Safflower oil | 107° C. |
| Sesame oil | 177° C. |
| Soybean oil | 234° C. |
| Sunflower oil | 107° C. |
| Grape seed oil | 216° C. |
| Vegetable oil blend | 220° C. |

The invention also provides an oleogel comprising 0.5-40 wt. % protein, preferably comprising at least 1 wt. % of protein, more preferred at least 5 wt. % of protein such as 8-40 wt. % of protein; 0-40 wt. % of water, preferably 0.1-30 wt. %, preferably 0.5-20 wt. %, more preferred 1-10 wt. % of water; and 20-99.5 wt. %, preferably 60-98.5 wt. %, more preferred 80-92 wt. % of oil. A preferred oleogel comprises 8-40 wt. % protein, 0.5-20 wt. % of water, preferably between 0.75 and 10 wt. % of water, and 40-92 wt. % of an oil. A further preferred oleogel comprises 8-20 wt. % protein, 0.5-20 wt. % of water, preferably between 1.5 and 7.5 wt. % of water, and 60-92 wt. % oil.

Said oleogel according to the invention preferably does not comprise a chemical cross-linker, a gelling agent, ethylcellulose, a surfactant, and/or a glue such as a gum.

Said oleogel differs from the oleogel described in EP3011836A. As is described in EP3011836A, an oleogel comprises 0.5-30 wt. % protein, 70-99.5 wt. % lipid material comprising oil, and 0-10 wt. % of one or more other components. Said other components are described as one or more of a salt, a sugar, a fat, a fatty acid, an amino acid, a bioactive compound (such as a vitamin), a gelling agent (such as a polysaccharide), and a surfactant. Hence, the oleogel of EP3011836 specifically excludes water, which is present at least at 0.1 wt. % in an oleogel of this invention.

Similarly, the oleogel described in EP3387909A comprises an oil or mixture of oils, a structuring agent or mixture of structuring agents, and a fat or fat mixture, and thus also seems to lack water. In addition, the structuring agent is selected from monoglycerids of fatty acids, and said oleogel thus lacks protein, which is present at least at 0.5 wt. % in an oleogel of this invention.

Said oleogel preferably is obtainable with the above described method.

Although not required to produce a stable oleogel according to the invention, a stabilizer may be added to modify the properties of the oleogel. Said stabiliser may maintain the physico-chemical state of the oleogel and/or stabilize, retain or intensify an existing colour of the oleogel. Examples of suitable stabilizers that may be used is an edible stabilizer such as alginic acid, agar agar, carrageenan, gelatin, pectin, calcium chloride and lecithin.

If added, the stabilizer is preferably present in an amount resulting in an amount of less than 5 wt. % of the total weight of the oleogel, preferably less than 2 wt. % of the total weight of the oleogel, preferably less than 1 wt. % of the total weight of the oleogel.

The oleogel may be used as such, or may be processed into smaller gel particles.

Products

The invention further provides a food product comprising an oleogel as defined herein. Said food product preferably further comprises a salt, a sugar, a fatty acid, an amino acid, a vitamin, a bioactive compound, a gelling agent (such as a polysaccharide), a surfactant, and/or a flavour.

Examples of food products that can be prepared by using the present oleogel include baked goods such as cookies and cakes; spreads such as margarine and chocolate spreads; chocolate and fillings; and meat products, such as a minced meat products such as a hamburger, or a meat emulsion product such as bologna, mortadella, frankfurters, or other sausage products. Further applications of the oleogel as described herein may be in low fat spreads, wherein the oleogel may improve, e.g., mouth feel and/or stabilization of the emulsion, in meat and fish products to improve texture and/or gelling, in desserts or dairy products for improving texture, thickening, and/or gelling, and in confectionary products for improving gelling, texture, chewability, stabilization, and/or binding.

Said oleogel may provide a continuous phase, such as e.g. in the case of a spread, or a discontinuous phase with oleogel regions having one or more dimensions selected from length, width, height, and diameter in the range of up to 10 mm, as may be the case in meat products.

A food product preferably is selected from the group consisting of a processed food or feed product, such as pudding, mousse, butter, pizza, granola, energy bar, canned meat, cured meat, ham, sausage, bacon, cheese, yoghurt, refined oil, cooking spray, margarine, salad dressing, barbeque sauce, mayonnaise, peanut butter, syrup such as corn syrup and rice syrup, honey, candy bar, soft candy, pudding, dessert mix, ice cream, frozen dessert, whipped cream, chocolate, marshmallow, shredded coconut, sugar substitute and drinks such as soft drinks, fruit drinks and instant breakfast drinks.

The invention further provides a non-food product comprising an oleogel according to the invention. Said non-food product may be selected from the group consisting of an animal feed product, a cosmetic product, and a pharmaceutical product.

Said animal feed product includes broiler feed and pet food and may be in the form of a concentrate comprising, for example, energy-rich and protein-rich grains, fat and molasses, or in the form of a mixed feed product.

A product comprising an oleogel according to the invention may be used as delivery system for a drug, which may be of interest in cosmetic and/or pharmaceutical applications. Said drug preferably is or comprises a hydrophobic molecule.

A cosmetic or pharmaceutical product comprising an oleogel according to the invention may be administered to provide a local or systemic effect. Said cosmetic or pharmaceutical product may be administered onto or through the skin, or administered orally, for example when present in a tablet or a capsule. Said tablet of capsule preferably comprises an enteric coating to prevent the bioavailability of the drug in the stomach.

Said cosmetic product comprises an oleogel according to the invention and at least one cosmetically active ingredient. Said cosmetically active ingredient can be any ingredient which gives a cosmetic effect, i.e. an ingredient which, when placed in contact with the various external parts of the human body, including skin, pilous and hair system, nails, lips and outer genital organs, and also including teeth and oral mucosae. Said cosmetic product may be applied, exclusively or mainly, to an external part of the human body in order to cleanse them, to fragrance them, to modify their appearance and/or to correct odours. In addition, said cosmetic product may be applied to protect an external part of the human body or keep it in good condition.

The cosmetically active ingredient preferably is a moisturizer, sun-protecting product, anti-free-radical agent or a skin regenerator which are soluble in either the oleogel or the aqueous gel phases.

Said cosmetic product preferably is a body-care oil, and more particularly a bath oil such as sesame oil or argan oil. Depending on the type of cosmetically active ingredient used, a person skilled in the art will be able to determine its appropriate proportion by weight, relative to the total weight of the cosmetic product comprising an oleogel according to the invention.

Said pharmaceutical product comprises at least one active pharmaceutical ingredient. Said pharmaceutical product may also include a first active ingredient in the oily phase and a second, different, active ingredient in the aqueous phase. Said first and second active ingredients may be incompatible meaning that the active ingredients are capable of reacting together in a chemically or therapeutically undesirable manner.

Suitable active ingredients that can be included in a pharmaceutical product include allergens and vaccines, hormones such as steroids and corticoids, dermatologically active ingredients, antimicrobial agents, cancer chemotherapeutic agents, anti-inflammatory agents and wound repair agents.

Said pharmaceutical product may further encompass any pharmaceutically acceptable salts, esters, or salts of such esters.

Pharmaceutically acceptable base addition salts are formed with metals or amines, such as alkali and alkaline earth metals or organic amines. Examples of metals used as cations are sodium, potassium, magnesium, calcium, and the like. Examples of suitable amines are N,N'-dibenzylethylenediamine, chloroprocaine, choline, diethanolamine, dicyclohexylamine, ethylenediamine, N-methylglucamine, and procaine. The base addition salts of said acidic compounds are prepared by contacting the free acid form with a sufficient amount of the desired base to produce the salt in the conventional manner. The free acid form may be regenerated by contacting the salt form with an acid and isolating the free acid in the conventional manner. The free acid forms differ from their respective salt forms somewhat in certain physical properties such as solubility in polar solvents, but otherwise the salts are equivalent to their respective free acid for purposes of the present invention. As used herein, a "pharmaceutical addition salt" includes a pharmaceutically acceptable salt of an acid form of one of the components of the compositions of the invention. These include organic or inorganic acid salts of the amines. Preferred acid salts are the hydrochlorides, acetates, salicylates, nitrates and phosphates. Other suitable pharmaceutically acceptable salts are well known to those skilled in the art and include basic salts of a variety of inorganic and organic acids, such as, for example, with inorganic acids, such as for example hydrochloric acid, hydrobromic acid, sulfuric acid or phosphoric acid; with organic carboxylic, sulfonic, sulfo or phospho acids or N-substituted sulfamic acids, for example acetic acid, propionic acid, glycolic acid, succinic acid, maleic acid, hydroxymaleic acid, methylmaleic acid, fumaric acid, malic acid, tartaric acid, lactic acid, oxalic acid, gluconic acid, glucaric acid, glucuronic acid, citric acid, benzoic acid, cinnamic acid, mandelic acid, salicylic acid, 4-aminosalicylic acid, 2-phenoxybenzoic acid, 2-acetoxybenzoic acid, embonic acid, nicotinic acid or isonicotinic acid; and with amino acids, such as natural alpha-amino acids, for example glutamic acid or aspartic acid, and also with phenylacetic acid, methanesulfonic acid, ethanesulfonic acid, 2-hydroxyethanesulfonic acid, ethane-1, 2-disulfonic acid, benzenesulfonic acid, 4-methylbenzenesulfonic acid, naphthalene-2-sulfonic acid, naphthalene-1, 5-disulfonic acid, 2- or 3-phosphoglycerate, glucose-6-phosphate, N-cyclohexylsulfamic acid (with the formation of cyclamates), or with other acid organic compounds, such as ascorbic acid. Pharmaceutically acceptable salts of compounds may also be prepared with a pharmaceutically acceptable cation. Suitable pharmaceutically acceptable cations are well known to those skilled in the art and include alkaline, alkaline earth, ammonium and quaternary ammonium cations. Carbonates or hydrogen carbonates are also possible.

Said steroids include oestradiol, progesterone, testosterone and 5α-dihydrotestosterone.

Said corticoids, also termed corticosteroids, include cortisol, corticosterone, cortisone, aldosterone, dexamethasone, prednisone and fludrocortisone.

Said antimicrobial agents include antibacterial agents, antifungal agents and antiviral agents, as is well known to the person of skill in the art. Antibacterial agents include, for example, natural and synthetic penicillins and cephalosporins, sulphonamides, erythromycin, kanamycin, azithromycin, clarithromycin, tetracycline, natamycin, nystatin, acyclovir, azidothymidine, vidarabine (9-β-D-arabinofuranosyladenine) and/or mixtures and derivatives thereof.

Said cancer chemotherapeutic agent preferably includes an alkylating agent such as nitrogen mustard, e.g. cyclophosphamide, mechlorethamine or mustine, uramustine and/or uracil mustard, melphalan, chlorambucil, ifosfamide; nitrosourea, including carmustine, lomustine, streptozocin; an alkyl sulfonate such as busulfan, an ethylenime such as thiotepa and analogues thereof, a hydrazine/triazine such as dacarbazine, altretamine, mitozolomide, temozolomide, altretamine, procarbazine, dacarbazine and temozolomide; an intercalating agent such as a platinum-based compound like cisplatin, carboplatin, nedaplatin, oxaliplatin and satraplatin; an anthracycline such as doxorubicin, daunorubicin, epirubicin and idarubicin; mitomycin-C, dactinomycin, bleomycin, adriamycin, and mithramycin.

The term "substantially", as is used herein, will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%.

The term "comprise", as is used herein, includes also embodiments wherein the term "comprise" means "consist of", but may in another embodiment also refer to "containing at least the defined species and optionally one or more other species". Use of the verb "to comprise" and its conjugations does not exclude the presence of elements or steps other than those stated in a claim.

The term "and/or", as is used herein, relates to one or more of the items mentioned before and after "and/or". For instance, a phrase "item 1 and/or item 2" and similar phrases may relate to one or more of item 1 and item 2.

The terms "first, second, third and the like" in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The article "a" or "an" preceding an element does not exclude the presence of a plurality of such elements.

The various aspects discussed in this patent can be combined in order to provide additional advantages.

EXAMPLES

Example 1

Materials and Methods 4 g of native whey protein was dispersed into 200 ml of oil using a magnetic stirring bar in a 200 ml flask to obtain a 2% protein dispersion. This dispersion was divided in three samples.

To sample 1, 0.25 g water/g protein was added (1 mL water). The sample was stirred overnight using a magnetic stirring bar. Subsequently, sample 1 was heated in a water bath at 85° C. for 20 minutes while continuously stirring.

To sample 2, 0.25 g water/g protein (1 mL water) was added at day 1, and another 0.25 g/g protein at day 2. After 2 days, the sample was heated.

For sample 3, 0.25 g/g protein was added three times over a 3 day period, after which it was heated. An overview of this experiment is presented in Table 2. After heating, the samples were immediately cooled using an ice bath. The dispersion was homogenized and centrifuged. The supernatant was removed by decanting and the remaining pellet formed an oleogel.

TABLE 2

Overview of the differently prepared in-oil-gelling samples

| Sample | Total g water/ g proteins | Day 1 | Day 2 | Day 3 | Day 4 |
|---|---|---|---|---|---|
| 1 | 0.25 | 0.25 g water/ g protein added | Heated | | |
| 2 | 0.5 | 0.25 g water/ g protein added | 0.25 g water/ g protein added | Heated | |
| 3 | 0.75 | 0.25 g water/ g protein added | 0.25 g water/ g protein added | 0.25 g water/ g protein added | Heated |

Results

One sample was made with a water content below the maximum expected water content for capillary bridge formation (0.25 g per g water), one at maximum expected water content (0.5 g per g water) and one above the expected maximum water content (0.75 g per g water).

Sample 1, containing 0.25 g water/g protein, was heated while stirring to induce aggregation and provide enough time for the water to diffuse through the oil. No obvious change in the consistency was observed. The sample was then centrifuged to induce gel formation, and a gel-like material was obtained (FIG. 1A). To the other two samples, an additional 0.25 g water/g proteins was added, and again left overnight while stirring. The next day, one of the samples with a water content of 0.5 g/g protein showed the formation of large clumps during heating and a very weak "slimy" gel was formed after centrifugation (FIG. 1B). When more water was first added to get to a maximum of 0.75 g/g protein, the sample formed a strong solid already before heating the sample (FIG. 1C). This strong solid did not have the macroscopic properties of a soft deformable gels. In fact, the sample could best be compared with a strong rubber/plastic (FIG. 1C). These results show that indeed gel formation can be obtained by slow addition of water in different amounts, and that the consistency of the products can vary a lot, from liquid to solid.

Example 2

10 grams of whey protein isolate was dispersed into 40 grams of ethanol as dispersing agent. This mix was added to 240 grams of sunflower oil, and stirred at 200 rpm for 4 hours. The protein content was 4%. The ethanol was then removed by heating the mixture at 40 degrees Celsius on a magnetic stirring plate (200 rpm). The ethanol was removed in 3 hours. The mixture was then sonicated for 20 minutes with a 1.7 mm probe at a frequency of 20 kHz, an amplitude of 50% of 400 W total power. A pulse of 0.1 seconds was used.

The mixture was then split into 8 samples, which were centrifuged at 3900 rpm for 20 minutes. The supernatant, containing mostly oil, was removed, and the pellet, containing mostly proteins, was collected. The pellet contained roughly 30% of protein.

To the pellets, different amounts of water was added in steps of 0.1 gram. After addition of step of 0.1 gram water/g protein, the water was allowed to diffuse for 1 day. After that, an additional 0.1 gram water was added. This process was repeated for 4 days, thus adding a total of 0.4 gram water. The resulting material was a paste-like material, for which the storage modulus was larger than the loss modulus. The storage modulus of samples obtained with 0.1 gram water/g protein was found to be 20000 Pa.

In a similar way, dispersions of 8% and 10% protein were made, using 4 gram ethanol/gram protein. The dispersions were centrifuged to increase the protein content. After decanting off the remaining oil, the samples were sonicated again to prevent clump formation. In this way, a protein content between 10 and 30% was prepared. To these dispersions, different amounts of water in steps of 0.1 gram water/gram protein was added to induce network formation.

The invention claimed is:

1. A method for production of an oleogel, the method comprising:
    (i) providing a powdered protein from which a 0.5-40 wt. % dispersion of protein in oil is generated;
    (ii) adding between 0.05 and 1 gram of water per gram protein to the dispersion; and
    (iii) mixing the dispersion for a sufficient period of time to produce a solid oleogel.

2. The method of claim 1, wherein the protein in oil dispersion is homogenized prior to the addition of water.

3. The method of claim 1, wherein the protein in oil dispersion is homogenized by sonication prior to the addition of water.

4. The method of claim 1, wherein the total amount of water is added in two or more steps to the dispersion.

5. The method of claim 1, wherein the total amount of water is added in steps of 0.05-0.25 water/gram protein.

6. The method of claim 1, wherein between 0.1 and 5 gram of a dispersing agent is added to the protein in oil dispersion, prior to the addition of water.

7. The method of claim 6, wherein the dispersing agent is ethanol.

8. The method of claim 1, wherein the total amount of water is added in steps of 0.05-0.25 gram water/gram protein, and each step of 0.05-0.25 gram water/gram protein is allowed to mix for a period of 1-24 hours.

9. The method of claim 1, wherein the produced solid oleogel is heated to a temperature between 25 degrees Celsius and the boiling point of the oil.

10. The method of claim 1, wherein the solid oleogel is an edible solid oleogel.

11. The method of claim 1, wherein the protein is a globular protein.

12. The method of claim 1, wherein the oil is a vegetable oil.

13. The method of claim 1, wherein the edible oleogel produced comprises 0.5-40 wt. % protein, 0.1-40 wt. % of water, and 20-99.5 wt. % oil.

14. The method of claim 1, wherein the edible oleogel produced comprises 8-40 wt. % protein, 0.1-40 wt. % of water, and 20-99.5 wt. % oil.

15. The method of claim 1, further comprising combining the solid oleogel with one or more of: an edible meat product or an edible baked product.

16. A method for production of an edible oleogel, the method comprising:
 (i) providing a powdered protein from which a 0.5-40 wt. % dispersion of protein in oil is generated;
 (ii) adding between 0.05 and 1 gram of water per gram protein to the dispersion;
 (iii) mixing the dispersion for a sufficient period of time to produce a solid oleogel comprising 0.5-40 wt. % protein, 0.1-40 wt. % of water, and 20-99.5 wt. % oil; and
 (iv) combining the solid oleogel with one or more of: an edible meat product or an edible baked product.

17. The method of claim 16, wherein combining the solid oleogel with one or more of: the edible meat product or the edible baked product comprises combining with a chocolate.

18. The method of claim 16, wherein combining the solid oleogel with one or more of: the edible meat product or the edible baked product comprises combining with a filling.

19. The method of claim 16, wherein the edible oleogel comprises 8-40 wt. % protein, 0.1-40 wt. % of water, and 20-99.5 wt. % vegetable oil.

20. An edible oleogel comprising 0.5-40 wt. % protein, 0.1-40 wt. % of water, and 20-99.5 wt. % oil.

\* \* \* \* \*